United States Patent

Matsushita et al.

[11] Patent Number: 5,519,080
[45] Date of Patent: May 21, 1996

[54] INSULATORS

[75] Inventors: Takao Matsushita, Kisarazu; Katsuya Baba, Kamagaya; Kazuo Hirai, Sodegaura; Isao Nakajima, Nagoya; Takayuki Takeda, Ichinomiya, all of Japan

[73] Assignees: Dow Corning Toray Silicone Co., Ltd.; NGK Insulators Ltd., Japan

[21] Appl. No.: 288,505

[22] Filed: Aug. 10, 1994

[30] Foreign Application Priority Data

Aug. 17, 1993 [JP] Japan .................................. 5-203415

[51] Int. Cl.$^6$ .................................................. C08K 9/06
[52] U.S. Cl. ........................... 524/437; 524/268; 524/493; 524/861; 524/862
[58] Field of Search .......................... 524/268, 437, 524/493, 861, 862

[56] References Cited

U.S. PATENT DOCUMENTS

| | | | |
|---|---|---|---|
| 4,659,754 | 4/1987 | Edwards et al. | 524/514 |
| 5,326,804 | 7/1994 | Mistry et al. | 524/437 |
| 5,369,161 | 11/1994 | Kunieda et al. | 524/437 |
| 5,378,742 | 1/1995 | Matsushita et al. | 523/213 |

FOREIGN PATENT DOCUMENTS

| | | |
|---|---|---|
| 0057098 | 8/1982 | European Pat. Off. |
| 0470745 | 2/1992 | European Pat. Off. |
| 3616621 | 11/1986 | Germany. |
| 59-198604 | 11/1984 | Japan. |
| 62-60794 | 12/1987 | Japan. |
| 4-209655 | 7/1992 | Japan. |

*Primary Examiner*—Kriellion S. Morgan
*Attorney, Agent, or Firm*—Parkhurst, Wendel & Rossi

[57] ABSTRACT

An insulator includes a housing portion. The housing portion is composed a silicone rubber obtained by curing a composition containing diorganopolysiloxane (A) and a fine silicon powder (B) by heating, and a methylalkylpolysiloxane oil (C). The diorganopolysiloxane has at least two silicon atom-bonded alkenyl groups in one molecule. The methylalkyl-polysiloxane oil (C) has each of both terminal ends of each molecular chain blocked with a trialkysiloxy group and possessing a viscosity at 25° C. being 1 to 1,000 centistokes, and is incorporated into the above composition in an amount of 1–100 parts by weight per 100 parts by weight of the component (A).

16 Claims, 1 Drawing Sheet

INSULATORS

BACKGROUND OF THE INVENTION (1) Field of the Invention

The present invention relates to insulators adapted to be used for supporting transmission lines or the like and particularly having excellent water-repellency recoverability.

(2) Related Art Statement

So-called polymer insulators are each constituted by covering the outer periphery of a core member made of an FRP with shed portions made of silicone rubber. It has come to be known that such polymer insulators exhibit large effects such as prevention of corona noise and flash-over in polluted environments due to excellent water repellency of silicone rubber.

In general, shaped bodies made of polymer materials exhibit water repellency at an initial use stage. However, there is a drawback that when such shaped bodies are used outside, they lose their water repellency in a relatively short time due to irradiation with solar beams (ultraviolet rays). On the other hand, it is known that fluorine resins represented by Teflon, silicone rubber and silicone resin are strong against ultraviolet rays.

However, when even fluorine resin or silicone resin is used as a covering material for high voltage insulators, their water repellency is unfavorably lost with the lapse of time by being exposed to partial discharging at the surface thereof, and pollutants attached onto the surfaces. Some researchers reported, however, that although silicone rubber among the above materials tentatively loses water repellency when the surface is exposed to partial discharging or attached with pollutant, such silicone rubber recovers its water repellency after that (for example, after 24 hours). This is a fact that the inventors also confirmed.

Although the mechanism by which this water-repellency is recovered has not been clarified, certain researchers explain that this mechanism is based on the phenomenon that a low molecular silicone component contained in silicone rubber gradually oozes out with the lapse of time. The present inventors have confirmed this through various experiments, and support the above explanation.

Such a kind of the low molecular silicone Component is not a component positively added into silicone rubber, but exists in only an extremely small amount as a byproduct produced in the production step of diorganopolysiloxane, which is used as a main starting material for silicone rubber. For this reason, there is a problem that the low molecular silicone component is being exhausted as the use time period increases, so that the time required to recover water repellency increases, and the effects of preventing the corona noise and flash-over in the polluted environments become smaller.

SUMMARY OF THE INVENTION

The present invention has been accomplished, noticing the problems of the prior art. The invention is aimed at the provision of an insulator which can assuredly prevent the corona noise and flash-over in the polluted environments by continuously transferring a low molecular silicone component in silicone rubber onto the surface of the insulator and thereby improving water repellency recoverability.

In order to accomplish the above object, the present invention is characterized in that the insulator comprises a housing portion, said housing portion comprising a silicone rubber obtained by curing a composition containing (A) diorganopolysiloxane and (B) a fine silicon powder by heating, said diorganopolysiloxane having at least two silicon atom-bonded alkenyl groups in one molecule; and (C) a methylalkylpolysiloxane oil having each of both terminal ends of each molecular chain blocked with a trialkylsiloxy group and possessing a viscosity at 25° C. being 1 to 1,000 centistokes, said component (C) being incorporated into said composition in an amount of 1–100 parts by weight per 100 parts by weight of said component (A).

According to the present invention, the following are preferable.

(1) Powdery aluminum hydroxide (D) is further blended into said composition.

(2) An alkyl group in the component (C) is a methyl group.

These and other objects, features and advantages of the invention will be appreciated upon reading the following description of the invention when taken in conjunction with the attached drawings, with the understanding that some modifications, variations and changes of the same could be easily made by the skilled in the art.

BRIEF DESCRIPTION OF THE DRAWING

For a better understanding of the invention, reference is made to the attached drawing, wherein.

DETAILED DESCRIPTION OF THE INVENTION

Figure 1:
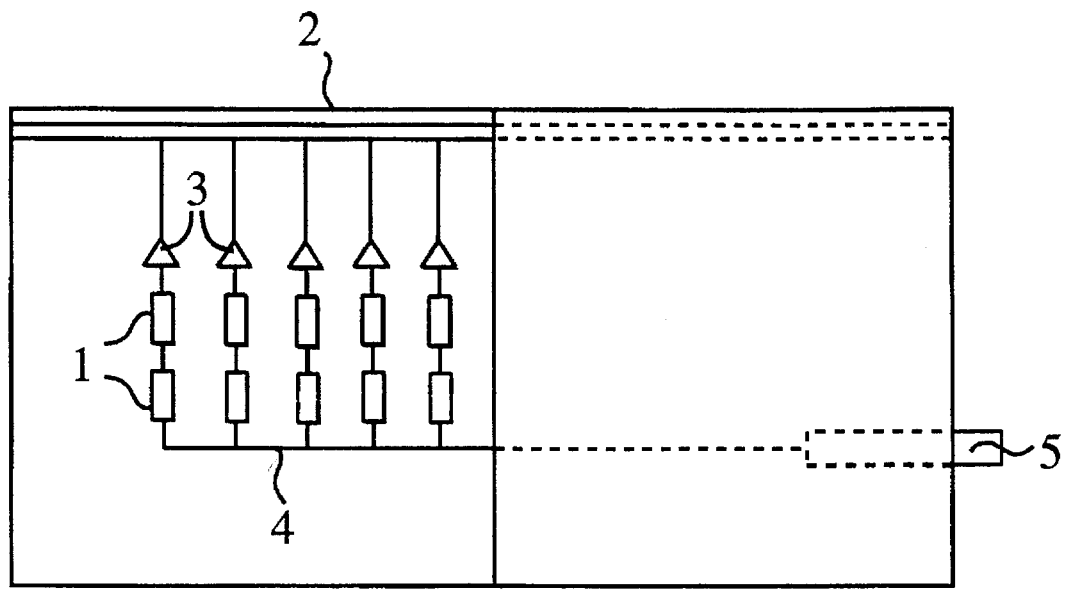
FIG. 1 is a schematic front view illustrating an accelerated testing apparatus using spraying with salt water.

It is necessary that diorganopolysiloxane used as the component (A) in the silicone rubber constituting the insulator of the present invention is a polysiloxane in which at least two silicon atom-bonded alkenyl groups are contained per one molecule. As such alkenyl groups, mention may be made of a vinyl group, an allyl group, and a propenyl group. As an organic group other than the alkenyl group in the component (A), mention may be made of alkyl groups such as a methyl group, an ethyl group, and a propyl group; aryl groups such as a phenyl group and a tolyl group; and substituted alkyl group including a 3, 3, 3-trifluoropropyl group and a 3-chloropropyl group. Among the above groups, the methyl is group is preferable, because it has hydrophobic property, and allows the low molecular component to be effectively transferred to the surface of the insulator.

The structure of the component (A) may be either a linear structure or a linear structure containing a branched portion. The molecular weight of the component (A) is not particularly limited, and what is called "organopolysiloxane raw rubber" in the art to which the invention pertains may be used. Usually, the organopolysiloxane having a viscosity at 25° C. of not less than $10^7$ centistokes and the average molecular weight Mw of not less than $5 \times 10^4$, preferably not less than $40 \times 10^4$ may be used.

The silica fine powder as the component (B) is a reinforcing filler to improve strength of silicon rubber.

As the silica fine powder, fumed silica, precipitated silica, and silica aerogel may be recited. Among them, super fine powder of fumed silica having the average particle diameter of not more than 50 μm and the specific surface area of not less than 100 m²/g is preferred. It is considered that the smaller the average particle diameter, the more excellent is the effect obtained. Further, surface-treated silica, for example, hydrophobic silica surface-treated with organosilane, hexaorganodisilazane or diorganocyclopolysiloxane may be used.

If the blended amount of this component (B) is too small, mechanical strength of the insulator is low, whereas if the blended amount is too great, it is difficult to fill aluminum hydroxide as the component (D) at a high content. Owing to this, the content of the component (B) is preferably in a range of 10–100 parts by weight per 100 parts by weight of the component (A), more preferably in a range of 20–80 parts by weight per 100 parts by weight of the component (A).

The component (C) is a methylalkylpolysiloxane oil which is sealed with trialkylsiloxane groups at both terminal ends of the molecular chain, and which features the present invention. The component (C) added continuously moves to the surface of the insulator, and shortens the time required for recovering water repellency thereof. Accordingly, the performance of the insulator, particularly, the effects of preventing corona noise and flash-over in the polluted environment last in the insulator for a long time. Consequently, the time at which the surface of the insulator is to be coated again and the time at which the insulator is to be exchanged can be prolonged to reduce necessary costs. The methyl group ie preferred among the above trialkylsiloxy groups, because the methyl group is hydrophobic, and can assuredly, continuously move to the surface of the insulator.

The viscosity of the methylalkylpolysiloxane oil sealed with the trialkylsiloxyl group at the opposite terminal ends of the molecular chain is in a range of 1–1,000 centistokes at 25° C. If the viscosity is high, the speed at which the methylalkylpolysiloxane oil moves to the surface decreases, so that the time required to recover water repellency increases. On the other hand, if the viscosity is low, the moving speed is so high that the low molecular silicone component is consumed up at an early stage. In view of this, the viscosity of this methylalkylalkylpolysiloxane oil is preferably in a range of 10–100 centistokes at 25° C. As the methylalkylpolysiloxane oil, mention may be made of dimethylpolysiloxane and diethylpolysiloxane. In the present invention, dimethylpolysiloxane is preferred.

The blended amount of the component (C) is in a range of 1–100 parts by weight per 100 parts by weight of the component (A). If the blended amount is too small, water repellency recoverability is damaged, whereas if it is too large, mechanical strength, etc. of the silicone are deteriorated. When the balance between the effects of the component (C) as the low molecular silicone rubber component and the physical properties of the silicone rubber composition, the blended amount of the component (C) is preferably in a range of 5–80 parts by weight per 100 parts by weight of the component (A).

Aluminum hydroxide as the component (D) functions to improve arc resistance of silicone rubber. This aluminum hydroxide is a compound represented by the chemical formula of $Al_2O_3 \cdot 3H_2O$ or $Al(OH)_3$. Aluminum hydroxide having the average particle diameter of less than 5 μm is preferred, and that having the average particle diameter of less than 1 μm is more preferred. If the blended amount of the component (D) is too small, arc resistance necessary for assuring the use life of the insulator is lost, whereas if the blended amount is too large, processability is deteriorated. For this reason, the content of the component (D) is preferably in a range of 15–300 parts by weight per 100 parts by weight of the component (A), and more preferably in a range of 50–200 parts by weight per 100 parts by weight of the component (A).

According to the present invention, in order to cure the composition composed of the components (A), (B) and (C) and optically further the component (D), an organic peroxide (E) is usually employed. As the organic peroxide as the component (E), mention may be made of benzoyl peroxide, bis-2,4-dichlorobenzoyl peroxide, dicumyl peroxide, 2,5-dimethyl-2,5-(t-butyl peroxide)hexane, parachlorobenzoyl peroxide, d-t-butyl peroxide, t-butyl peroxide benzoate, and orthochlordoenzoyl peroxide.

Silicone rubber constituting the insulator according to the present invention is a material obtained by curing the above components (A), (B) and (C) and optionally further the component (D) under heating. So long as the object of the present invention is not damaged, additives which are well known to be added and blended in the conventional silicone rubber compositions may be blended into the silicone rubber composition in the present invention besides the above components.

As the additives, mention may be made of a non-reinforcing filler, a pigment, a heat-resistive agent, a fire retardant, an internal mold lubricant and a plasticizer. As the non-reinforcing filler, mention may be specifically made of diatomaceous earth, quartz powder, calcium carbonate, mica, aluminum oxide, magnesium oxide, and titanium oxide. As the pigment, mention may be made of carbon black and blood red. As the heat-resistive agent, mention may be made of rare earth oxides, rare earth hydroxide, cerium silanolate, and cerium fatty acid salts. As the fire retardant, mention may be made of a Pt compound. As the internal mold lubricant, mention may be made of zinc stearate and calcium stearate. Further, as the plasticizer, mention may be made of silicon oil.

The silicone rubber composition used in the present invention may be easily produced by blending the above components (A), (B) and (C) and optically further the components (D) and (E) as well as further various additives if necessary, and kneading the blended mixture by a conventional kneading means, for example, by two rolls or a kneader mixer.

As a method for molding the insulator from the silicone rubber composition, a conventional process such as a compression molding, an injection molding or a transfer molding may be employed. The silicon rubber composition is cured into a housing portion of an insulator, for example, a polymer insulator, as a molding, by curing the composition under heating at 100°–250° C. for 2–30 seconds according to either of the above molding processes, thereby producing the insulator or the polymer as the molding. For example, the curing condition, which may depend on the content of the component (E), may be at 250° C. for 5 seconds~1 minute, or at 100° C. for 30–40 minutes. Even if thus obtained polymer insulator is exposed to partial discharging at the surface or any pollutant is attached to the surface thereof, water repellency can be speedily recovered, and such water repellency is maintained for a long time.

The insulators according to the present invention may include electrically insulating bushings, insulating housing, cable heads, and electric cable covers.

Experiments

Figure 2:
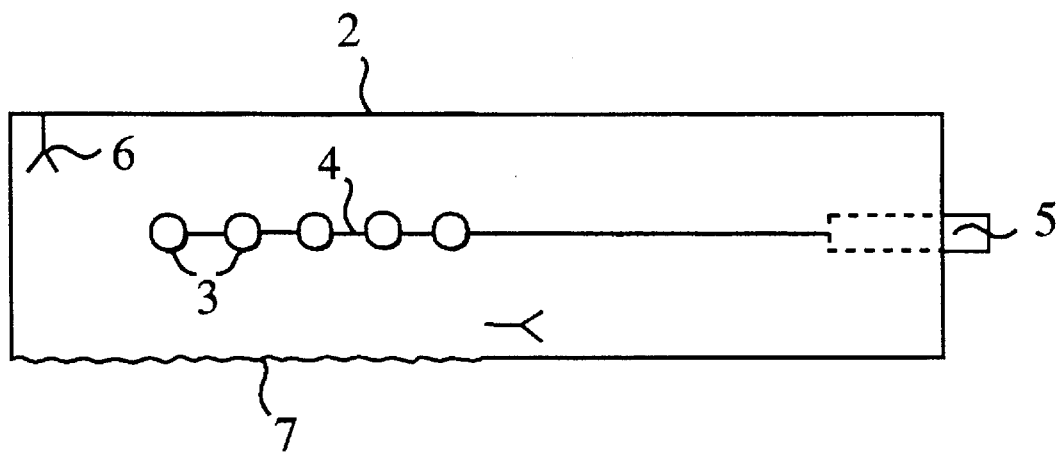
FIG. 2 is a schematic plane view illustrating the accelerated testing apparatus using spraying with salt water.

Next, the present invention will be specifically explained with reference to Examples and Comparative Examples. In Examples and Comparative Examples, "part" means "part by weight", and the viscosity is a value at 25° C. Further, in Examples and Comparative Examples, water repellent recoverability was evaluated as follows:

That is, in order to confirm an anti-aging effect in a short time, an accelerated aging test was carried out by salt fog aging. The condition for this accelerated aging test using spraying with salt water is shown in Table 1, and an arrangement of samples in a spraying chamber is illustrated in FIGS. 1 and 2. In these figures, test pieces 1 was constituted by two round rode each having a diameter of 25 mm and a length of 250 mm connected together, and hanged in plural rows through an insulating insulators 3 inside a tester 2. A electric conductor 4 is connected to a lower portion of the test piece 1 through a bushing 5 so as to apply voltage to the test piece 1. A spray nozzle 6 is attached inside the tester 2 to spray salt water. A fire-retardant curtain 7 is provided in a front face of the tester 2.

Voltage of 30 kV was applied to the test pieces 1 through the electric conductor 4. The test consisted of a spraying with salt water for 8 hours and a stoppage period per one cycle, and voltage was continuously always applied during the test including the spraying. Water repellency was evaluated by measuring a contact angle of pure water to the silicone rubber composition. With respect to each sample, changes in the contact angle with the lapse of time were measured after the cycling.

Example 1

Into kneading mixer were charged 100 parts of diorganopolyiloxane raw rubber (polymerization degree: 5000) composed of 99.8 mol % of a dimethylsiloxane unit and 0.2 mol % of a methylvinylsiloxane unit, 9.0 parts of dimethylsiloxane oligomer possessing the viscosity of 60 centistokes and having opposite terminal ends sealed with silanol groups, 25 parts of fumed silica having the specific surface area of 200 $m^2/g$, and 6.7 parts of dimethylpolysiloxane oil possessing the viscosity of 50 centistokes and having the opposite terminal ends of the molecular chain sealed with trimethylsiloxy groups. The mixture was kneaded under heating to realize homogenization, thereby preparing a silicone rubber-base compound.

To 100 parts of this silicone rubber-base compound were added and blended 100 parts of aluminum hydroxide, 0.08 parts of potassium stearate, and 1.5 parts of dimethylsiloxane oligomer possessing the viscosity of 60 centistrokes and having both terminal ends sealed with silanol groups by using two rolls. Into 100 parts of the resulting rubber composition was kneaded 0.4 parts of 2,5-dimethyl-2,5-di(t-butyl peroxy)hexane by means of two rolls, thereby preparing a silicone rubber composition. This composition was compression molded at 170° C. for 10 minutes, thereby preparing an insulator made of silicone rubber in a round rod-shaped form (Sample 1).

Example 2

An insulator having a round rod-shaped form was produced in the same manner as in Example 1 except that 13.4 parts of dimethylpolysiloxane oil possessing the viscosity of 50 centistokes and having both terminal ends of the molecule sealed with trimethylsiloxy groups was used (Sample 2).

Example 3

An insulator having a round rod-shaped form was produced in the same manner as in Example 1 except that 90.0 parts of dimethylpolysiloxane oil possessing the viscosity of 50 centistokes and having both terminal ends of the molecule sealed with trimethylsiloxy groups was used (Sample 3).

Comparative Example 1

An insulator having a round rod-shaped form was produced in the same manner as in Example 1 except that no dimethylpolysiloxane oil possessing the viscosity of 50 centistokes and having both terminal ends of the molecule sealed with trimethylsiloxy groups was blended (Sample 4).

Comparative Example 2

An insulator having a round rod-shaped form was produced in the same manner as in Example 1 except that 0.5 parts of dimethylpolysiloxane oil possessing the viscosity of 50 centistoke and having both terminal ends of the molecule sealed with trimethylsiloxy groups was blended (Sample 5).

With respect to the above Samples 1 through 5, changes in the contact angle with the lapse of time after the cycling are shown in Tables 2 through 5. Table 2 and 3 show the changes in the contact angle with the lapse of time after one cycle and 50 cycles, respectively, and Tables 4 and 5 show the changes in the contact angle with the lapse of time after 100 cycle and 200 cycles, respectively.

TABLE 1

| Item | Condition |
| --- | --- |
| Potential gradient (Test voltage) | 60 V/mm (AC 30 kV/two samples) |
| Conductivity in brine water | 500 ± 50μ/cm |
| Sprayed amount | 0.5 ± 0.21 $m^3$/h |
| Testing cycle | wet state: 8 hours dry state: 16 hours |
| Volume of spraying chamber | 5.8 $m^3$ |
| Inclination of sample | perpendicular |

TABLE 2

| Time of lapse | Example 1 sample 1 | Example 2 sample 2 | Example 3 sample 3 | Comparative Example 1 sample 4 | Comparative Example 2 sample 5 |
| --- | --- | --- | --- | --- | --- |
| Initial value | 111° | 111° | 111° | 109° | 109° |
| Immediately after test finished | 0 | 0 | 0 | 0 | 0 |
| 4 hrs | 61° | 63° | 65° | 48° | 47° |
| 8 hrs | 93° | 91° | 91° | 72° | 73° |
| 24 hrs | 110° | 110° | 110° | 100° | 101° |

TABLE 3

| Time of lapse | Example 1 sample 1 | Example 2 sample 2 | Example 3 sample 3 | Comparative Example 1 sample 4 | Comparative Example 2 sample 5 |
|---|---|---|---|---|---|
| Initial value | 110° | 110° | 110° | 110° | 110° |
| Immediately after test finished | 0 | 0 | 0 | 0 | 0 |
| 4 hrs | 61° | 58° | 63° | 39° | 40° |
| 8 hrs | 92° | 93° | 92° | 63° | 62° |
| 24 hrs | 110° | 110° | 110° | 89° | 90° |

TABLE 4

| Time of lapse | Example 1 sample 1 | Example 2 sample 2 | Example 3 sample 3 | Comparative Example 1 sample 4 | Comparative Example 2 sample 5 |
|---|---|---|---|---|---|
| Initial value | 110° | 110° | 110° | 110° | 110° |
| Immediately after test finished | 0 | 0 | 0 | 0 | 0 |
| 4 hrs | 55° | 59° | 60° | 25° | 24° |
| 8 hrs | 85° | 92° | 91° | 43° | 43° |
| 24 hrs | 100° | 110° | 110° | 71° | 70° |
| 48 hrs | 110° | 110° | 110° | 79° | 79° |

TABLE 5

| Time of lapse | Example 1 sample 1 | Example 2 sample 2 | Example 3 sample 3 | Comparative Example 1 sample 4 | Comparative Example 2 sample 5 |
|---|---|---|---|---|---|
| Initial value | 110° | 110° | 110° | 110° | 110° |
| Immediately after test finished | 0 | 0 | 0 | 0 | 0 |
| 4 hrs | 51° | 54° | 53° | 19° | 20° |
| 8 hrs | 75° | 85° | 87° | 32° | 31° |
| 24 hrs | 95° | 103° | 101° | 49° | 50° |
| 48 hrs | 103° | 110° | 110° | 61° | 60° |

As shown in Tables 2 through 5, even after the 100 cycle testing and 200 cycle testing, Examples 1 though 3 almost recovered their initial stage water repellency 24 hours after the testing (contact angle: 95 to 100 degrees). On the other hand, in Comparative Examples. 1 and 2, the water-repellency recoverable power was small even after 50 cycle testing, and the contact angle was 89 to 90 degrees 24 hours after the testing.

Comparative Example 3

A silicone rubber-base compound was prepared in the same manner as in Example 1 except that 110 parts of dimethylpolysiloxane oil possessing the viscosity of 50 centistokes and having both terminal ends of the molecule sealed with trimethylsiloxy groups was blended. This silicone rubber-base compound had roll processability, and did not produce a silicon rubber composition as a uniform mixture. As a result, an insulator having a round rod-shaped form could not be molded.

The present invention is not limited to the above-mentioned Examples, but the construction of the invention may be arbitrarily varied and their variations can be substantiated in the following manner so long as such variations do not fall outside the gist of the invention.

(1) A plural rubber layers are used in the surface portion of the insulator, and ordinary rubber is used for an inner layer thereof, whereas the silicon rubber in the present invention is used for the outermost layer.

(2) The silicone rubber layer in the present invention is formed in the surface portion of a porcelain insulator, a glass insulator or a resin insulator.

(3) The silicon rubber layer is formed in the surface portion of the insulator by coating.

(4) The composition in the present invention is constituted by (A) diorganopolysiloxane and (B) methylalkylpolysiloxane oil only without blending (C) silica fine powder or (D) aluminum hydroxide powder.

As having been explained in detail, according to the present invention, since the low molecular silicon component in the silicone rubber assuredly, continuously moves to the surface of the rubber, excellent effects can be obtained, that water repellent recoverability is improved, and corona noise and flash-over in the polluted environments can be assuredly prevented. Therefore, the time at which the surface of the insulator is to be coated again and time at which the insulator is to be exchanged can be delayed, so that necessary costs can be reduced.

What is claimed is:

1. An insulator comprising a housing portion, said housing portion comprising a silicone rubber obtained by curing a composition containing (A) diorganopolysiloxane and (B) a fine silica powder by heating, said diorganopolysiloxane having at least two silicon atom-bonded alkenyl groups in one molecule; and (C) a methylalkylpolysiloxane oil having each of both terminal ends of each molecular chain blocked with a trialkylsiloxy group and possessing a viscosity at 25° C. being 1 to 1,000 centistokes, said component (C) being incorporated into said composition in an amount of 1–100 parts by weight per 100 parts by weight of said component (A).

2. The insulator set forth in claim 1, wherein (D) powdery aluminum hydroxide is further blended into said composition.

3. The insulator set forth in claim 1, wherein an alkyl group in the component (C) is a methyl group.

4. The insulator set forth in claim 1, wherein said silicon atom-bonded alkenyl group in said diorgano-polysiloxane (A) is selected from the group consisting of a vinyl group, an allyl group, and a propenyl group.

5. The insulator set forth in claim 1, wherein an organic group other than the alkenyl group in said diorganopolysiloxane (A) is selected from the group consisting of alkyl groups such as a methyl group, an ethyl group, and a propyl group; aryl groups such as a phenyl group and a tolyl group; and substituted alkyl group including a 3,3,3-trifluoropropyl group and a 3-chloropropyl group.

6. The insulator set forth in claim 5, wherein said organic group other than the alkenyl group in the diorganopolysiloxane (A) is the methyl group.

7. The insulator set forth in claim 1, wherein said diorganopolysiloxane (A) has a viscosity at 25° C. of not less than $10^7$ centistokes and the average molecular weight Mw of not less than $5 \times 10^4$.

8. The insulator set forth in claim 1, wherein the viscosity of said methylalkylalkylpolysiloxane oil is in a range of 10–100 centistokes at 25° C.

9. The insulator set forth in claim 1, wherein said methylalkylpolysiloxane oil is selected from the group consisting of dimethylpolysiloxane and diethylpolysiloxane.

10. The insulator set forth in claim 1, wherein the blended amount of the component (C) is in a range of 5–80 parts by weight per 100 parts by weight of the component (A).

11. The insulator set forth in claim 1, wherein said silicon fine powder (B) is selected from the group consisting of fumed silica, precipitated silica, silica aerogel and a surface-treated silica.

12. The insulator set forth in claim 11, wherein said silicon fine powder (B) is super fine powder of fumed silica having the average particle diameter of not more than 50 μm and the specific surface area of not less than 100 m².

13. The insulator set forth in claim 1, wherein the content of the component (B) is in a range of 10–100 parts by weight per 100 parts by weight of the component (A).

14. The insulator set forth in claim 13, wherein the content of the component (B) is in a range of 20–60 parts by weight per 100 parts by weight of the component (A).

15. The insulator set forth in claim 2, wherein said aluminum hydroxide (D) has the average particle diameter of less than 5 μm.

16. The insulator set forth in claim 2, wherein the content of the component (D) is in a range of 15–300 parts by weight per 100 parts by weight of the component (A).

* * * * *